United States Patent [19]

Halls

[11] 4,270,338
[45] Jun. 2, 1981

[54] CROP HARVESTING MACHINE

[75] Inventor: Lawrence M. Halls, New Holland, Pa.

[73] Assignee: Sperry Corporation, New Holland, Pa.

[21] Appl. No.: 102,180

[22] Filed: Dec. 10, 1979

[51] Int. Cl.$^3$ ............................................ A01D 14/00
[52] U.S. Cl. ............................... 56/14.4; 56/DIG. 1
[58] Field of Search .................. 56/DIG. 1, 14.4, 208, 56/14.3, 14.5, 14.6

[56] References Cited

U.S. PATENT DOCUMENTS

| | | | |
|---|---|---|---|
| 3,672,138 | 6/1972 | Scarnato et al. | 56/158 |
| 3,683,602 | 8/1972 | Scarnato et al. | 56/14.4 |
| 3,733,796 | 5/1973 | Wood et al. | 56/220 |
| 3,835,629 | 9/1974 | Rosendahl et al. | 56/14.4 |
| 4,174,603 | 11/1979 | Parrish | 56/208 |
| 4,196,567 | 4/1980 | Davis et al. | 56/13.7 |

*Primary Examiner*—Robert A. Hafer
*Attorney, Agent, or Firm*—Larry W. Miller; Frank A. Seemar; James R. Bell

[57] ABSTRACT

A crop harvesting machine is disclosed wherein a crop engaging reel is mounted forwardly of a disc-type cutterbar so as to pick up downed crop material and to pull it rearwardly over the cutterbar toward a crop conditioner. The cutterbar includes a plurality of bottom driven rotary disc cutter units and an individually removable arcuate shield over each disc cutter unit partially forming a floor to aid the reel in conveying the severed crop material to the crop conditioner and to prevent the cutterbar from recutting the crop once initially severed from the ground. The shields are positioned so that only the cutter blade projects beyond the forward peripheral edge thereof to sever crop material from the ground.

18 Claims, 3 Drawing Figures

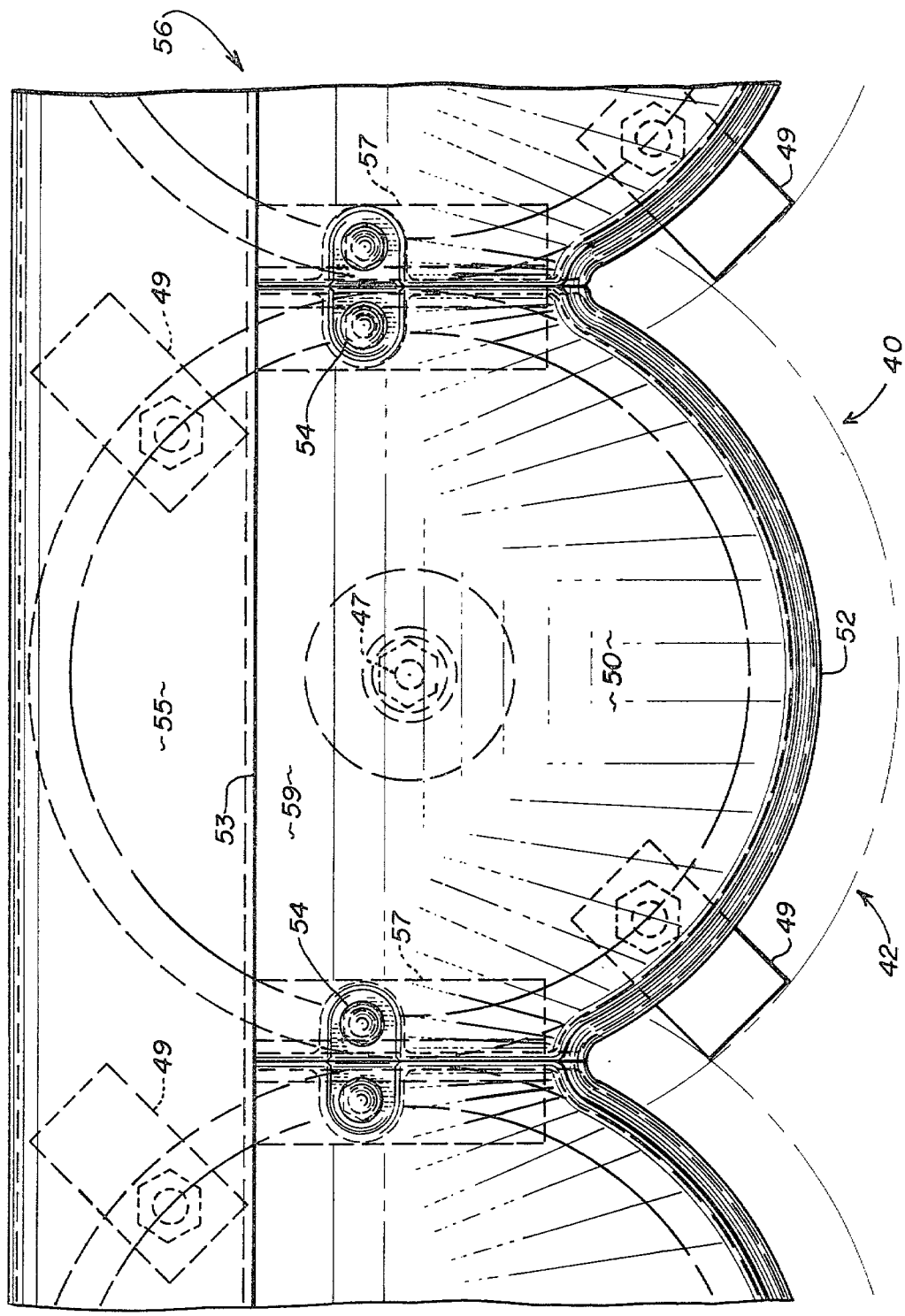

CROP HARVESTING MACHINE

BACKGROUND OF THE INVENTION

The present invention relates generally to crop harvesting machines and, more particularly, to disc mower-conditioners.

Disc mower-conditioners generally fall into two groups: those using a reel and those not using a reel. Disc mower-conditioners not having a reel utilize the action of the rotating disc cutters to convey severed crop material rearwardly toward the crop conditioner. This type of machine can be seen from the disc mower-conditioner illustrated, for example, in U.S. Pat. No. 4,094,132, in U.S. Pat. No. 3,673,779 and in U.S. Pat. No. 3,656,284. The cutter unit has been constructed as a flat disc or an upright drum unit, while the crop conditioner has traditionally been either of the flail type or roll type construction. A major problem with such harvesting machines is that the severed crop material is not efficiently conveyed to the conditioning unit and is, thereby, subject to being recut by the disc cutters.

To increase the efficiency of conveying the severed crop material to the conditioning unit, a reel can be added, as can be seen, for example, in German Pat. No. 2,151,156. Generally, this reel has been positioned rearwardly of the disc cutterbar for use solely to assist in conveying crop material toward the conditioning unit before it has a chance to be recut. Since the reel is not positioned forwardly of the cutterbar, it could not be used to pick up downed crop material.

One of the problems encountered with disc mower-conditioners is the placement of conditioning rolls relative to the cutterbar. If the rolls are too close to the cutterbar, they tend to engage tall crop material before the cutterbar can sever it from the ground. On the other hand, the further the rolls are positioned rearwardly, the greater the feeding problem becomes, hence the addition of the reel on some disc mower-conditioners.

U.S. Pat. No. 3,940,910 represents an attempt to utilize the reel to pick up downed crop material before being severed by the rotating cutters and still convey severed crop material rearwardly toward the conditioning rolls. A scalloped floor member was positioned over the cutterbar for projection rearwardly toward the conditioning rolls. However, this particular floor member created feeding problems of its own, particularly with smaller pieces of severed crop material commonly referred to as "fines," because this floor member was so steep and of such shape as to hinder proper feeding to the conditioning rolls. In an effort to partially overcome these particular feeding problems, the reel included a preselected combination of long and short tines to correspond to the shape of the scalloped floor member.

SUMMARY OF THE INVENTION

It is an object of this invention to overcome the aforementioned disadvantages of the prior art by providing a disc mower-conditioner utilizing a reel to both pick up downed crop material forward of the cutterbar and convey severed crop material rearwardly toward the conditioning means over a low profile arcuate shield positioned over each individual disc cutter unit.

It is another object of this invention to improve the feeding characteristics of disc mower-conditioners, while maintaining the ability to pick up downed crop material.

It is a still another object of this invention to provide a floor member structure cooperable with the reel for the efficient feeding of severed crop material toward the crop conditioning means.

It is still another object of this invention to improve the feeding efficiency of finely cut crop material from the cutterbar to the crop conditioning means.

It is yet another object of this invention to reduce the incidence of crop recutting before the severed crop is fed to the crop conditioning means.

It is a feature of this invention to construct the shields over the individual disc cutter unit such that the reel would operate substantially parallel thereto.

It is a further object of this invention to provide a floor member construction which does not require a reel having a preselected combination of long and short tines to obtain proper feeding operation to the crop conditioning means.

It is a still further object of this invention to provide an easy access to the individual disc cutter units of the cutterbar.

It is another feature of this invention that the reel can be used to pick up downed crop material, pull it rearwardly over the cutterbar and convey same toward the conditioning means.

It is yet another feature of this invention to use a bottom driven rotary type cutterbar which incorporates stationary ground engaging skids.

It is an advantage of this invention to utilize a low profile floor member so that proper orientation between the reel, cutterbar and conditioning means can be obtained.

It is an even further object of this invention to provide a disc mower-conditioner which is durable in construction, inexpensive in manufacture, facile in assemblage, and simple and effective in use.

These and other objects, features and advantages are accomplished according to the instant invention by providing a crop harvesting machine wherein a crop engaging reel is mounted forwardly of a disc-type cutterbar so as to pick up downed crop material to pull it rearwardly over the cutterbar and toward a crop conditioner. The cutterbar includes a plurality of bottom driven rotary disc cutter units and an individually removable arcuate shield over each disc cutter unit partially forming a floor to aid the reel in conveying the severed crop material to the crop conditioner and to prevent the cutterbar from recutting the crop once initially severed from the ground. The shields are positioned so that only the cutter blade projects beyond the forward peripheral edge thereof to sever the crop material from the ground.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is an enlarged partial view of the floor member, extending from over the rotary cutterbar toward the conditioning means, corresponding to line 3—3 in FIG. 2.

DETAILED DESCRIPTION OF THE INVENTION

Figure 1:
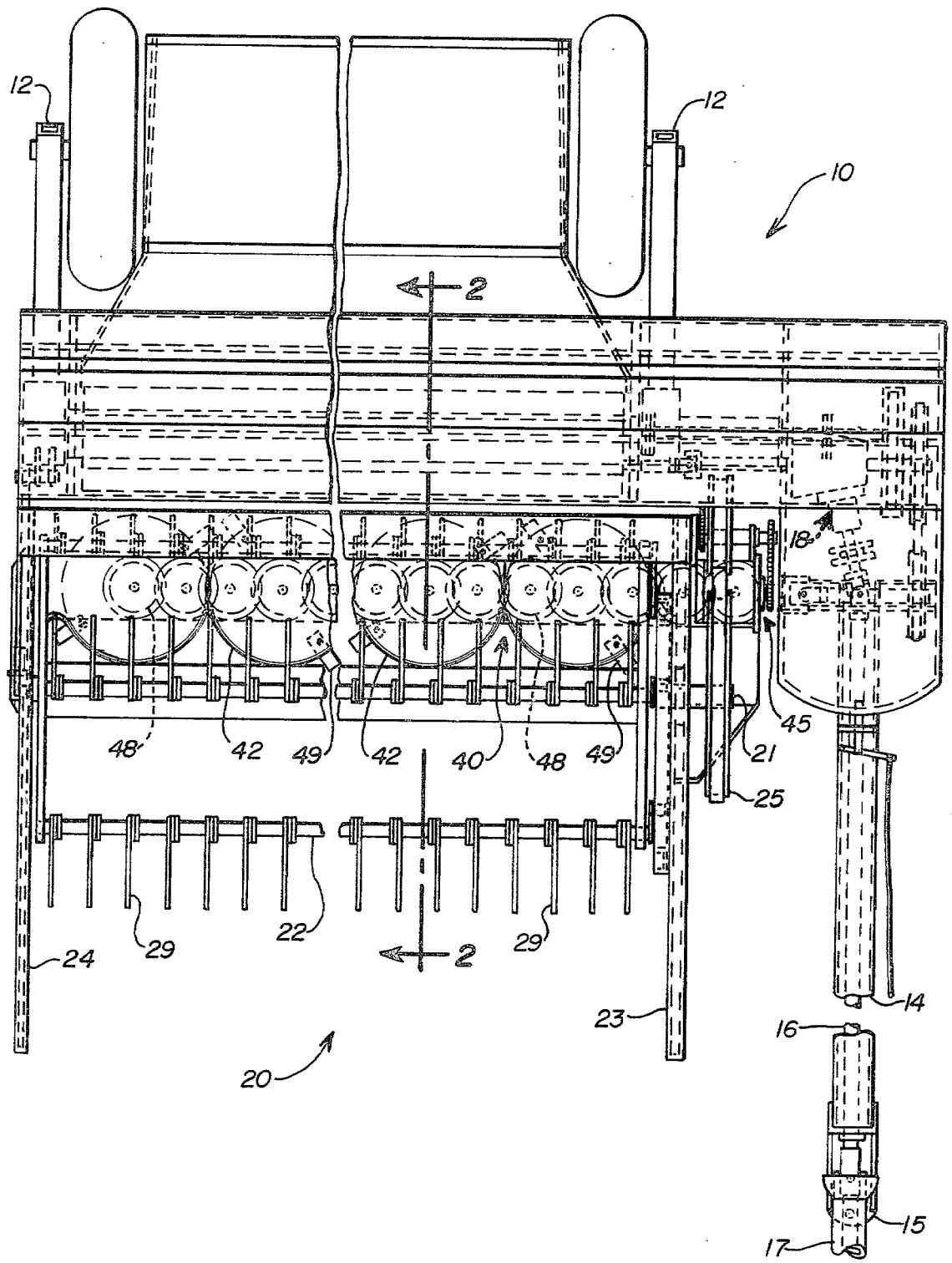
FIG. 1 is a top plan view of a pull-type disc mower-conditioner incorporating the principles of the instant invention.

Referring now to the drawings and, particularly, to FIG. 1, a top plan view of the crop harvesting machine, commonly referred to as a disc mower-conditioner, can be seen. Left and right references are used as a matter of convenience and are determined by standing at the rear of the machine facing the forward end, the direction of travel. This disc mower-conditioner 10 is generally comprised of a wheeled frame 12 and a crop harvesting header 20 operatively suspended forwardly thereof.

The frame 12 includes a forwardly extending drawbar 14 adapted at the forward end 15 for attachment to a tractor (not shown) for movement across the field to harvest crop material. A rotatable drive shaft 16 is housed within the drawbar 14 and is adapted at its forward end 17 for attachment to an external source of rotational power, such as the power takeoff shaft of the aforementioned tractor. The drive shaft 16 powers a primary drive mechanism indicated generally at 18 for drivingly powering the various parts of the disc mower-conditioner 10 described below. Further description of the drive mechanism 18 can be found in U.S. Pat. No. 4,127,981 granted to Charles A. Parrish et al. on Dec. 5, 1978.

The header 20 is defined by opposing side sheets 23, 24. The header includes a transversely mounted cutterbar 40 for severing crop material from the ground and a reel 22, including a plurality of tines 29, mounted forwardly of the cutterbar 40 for engaging crop material and pulling same rearwardly over the cutterbar 40. The reel 22 is mounted between opposing left and right side sheets 23, 24 about a transverse axis of rotation 21 and is rotatably driven by a reel drive mechanism 25 interconnected with the primary drive mechanism 18.

Figure 2:
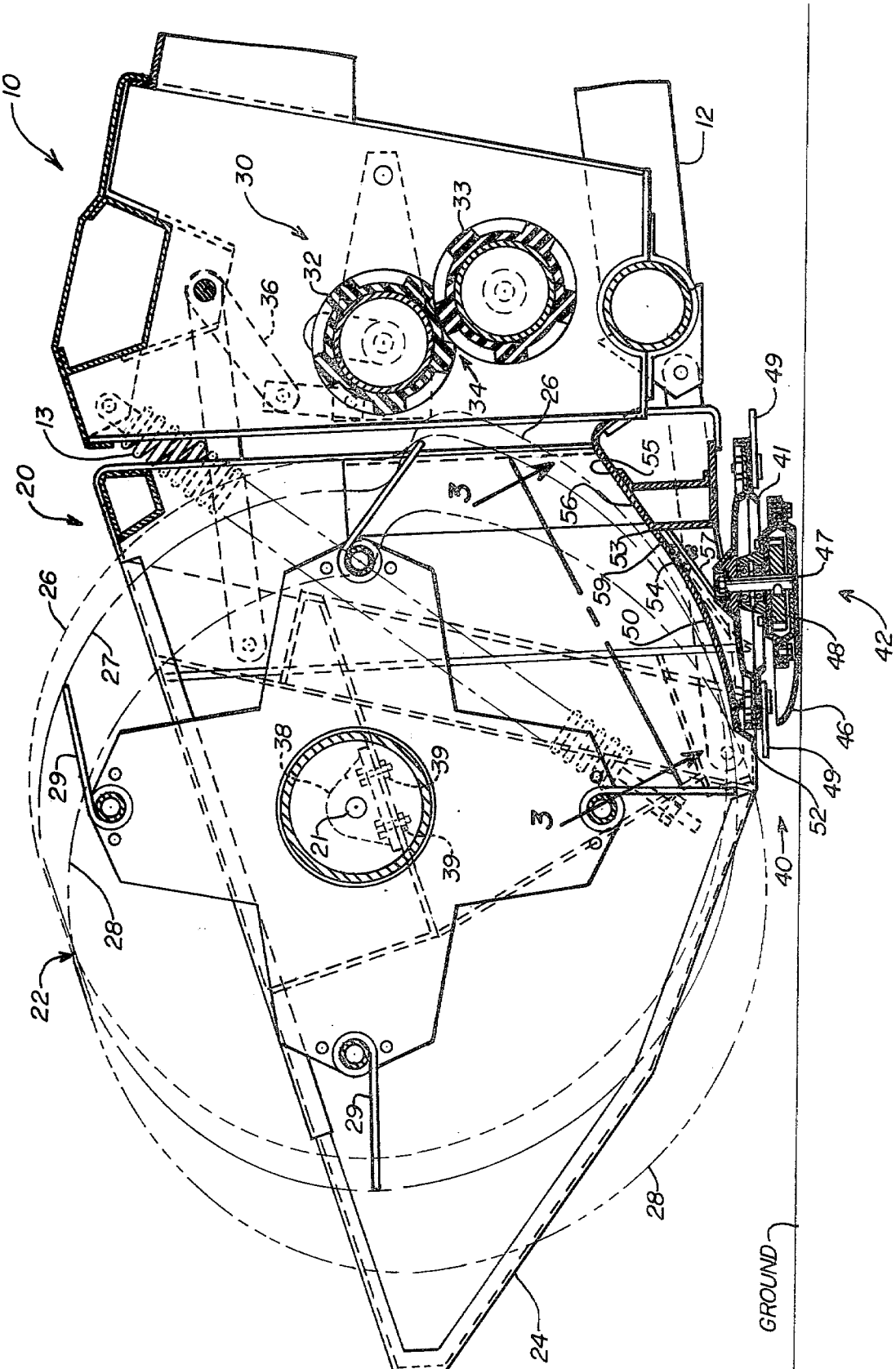
FIG. 2 is a partial cross sectional view of the disc mower-conditioner seen in FIG. 1 taken along lines 2—2.

As can be seen in FIGS. 1 and 2, the cutterbar 40 is mounted at a lower portion of the header 20, transverse to the line of travel and proximate to the ground for severing standing crop material. The cutterbar 40 includes a plurality of rotatable cutter units 42 positioned in a side-by-side relationship. The primary drive mechanism 18 provides rotational power through the cutterbar drive mechanism 45 which through internal gearing 48, provides rotational power to each individual cutter unit 42 such that adjacent units are rotated in opposite directions. Each cutter unit 42 includes at least one cutter blade 49 which is rotatable to sever crop material by impact action.

Referring now to FIG. 2, a cross sectional view of the disc mower-conditioner 10, taken through the center of one of the cutter units 42, can be seen. The header 20 is floatingly suspended from the frame 12 by a header suspension means 13 such that the header can follow the contour of the ground independently of the wheeled frame 12. A crop conditioning means 30, mounted in the frame 12 transverse to the direction of travel rearward of the header 20, is rotatably powered by the primary drive mechanism 18.

As is seen in the preferred embodiment of FIG. 2, the conditioning means 30 includes two transversely mounted conditioning rolls 32, 33. The upper roll 32 is mounted above and forward of the lower roll 33 in an intermeshing relationship therewith such that a bite 34 is defined therebetween. The upper roll 32 is biased for movement toward and away from the lower roll 33 by a biasing mechanism 36. It should be realized by one skilled in the art that crop conditioners other than the particular one shown in FIG. 2 may be utilized. Two examples of other crop conditioning means known in the art are non-intermeshing conditioning rolls and the rotating flail-type crop conditioner.

The reel 22 is rotatably mounted in an adjustment bracket 38 adjustably affixed to each side sheet 23, 24 by bolts 39. By selective manipulation of the position of the adjustment bracket 38, the reel 22 can be positioned in a plurality of positions as indicated schematically by circular arcs 26, 27 and 28. The forwardmost position 28 is generally used when the crop material is lodged close to the ground such that the reel is operative to pick up the downed crop material and pull it rearwardly over the cutterbar 40. In all positions, the reel 22 is operative to engage crop material and pull it rearwardly over the cutterbar 40. The position of the tines 29 is controlled by a cam mechanism (not shown) such that when the tines 29 have carried the crop material to a position proximate to the bite 34, the tines 29 are withdrawn perpendicularly to permit an unobstructed flow of the crop material to the crop conditioning means 30.

Each cutter unit 42 includes a rotating disc member 41 having at least one cutter blade 49 mounted thereon for rotation therewith to sever standing crop material by impact action. The disc member 41 is rotatable with spindle 47 which, in turn, is driven by the drive gearing 48 and serves as the axis of rotation of each respective cutter unit 42. Since the internal drive gearing 48 is positioned beneath the disc member 41, this type of cutterbar 40 is commonly referred to as being bottom driven. A further advantage of bottom driven cutterbars 40 is that a stationary ground engaging skid means 46 can be incorporated into each cutter unit 42.

Referring now to both FIGS. 2 and 3, a shield 50, concave relative to the reel 22 and having a center of curvature at the axis of rotation 21 of the reel 22 at the rearwardmost position 26, is positioned over each cutter unit 42 such that only a portion of the cutter blade 49 extends beyond the forward peripheral edge 52 during rotation of the disc member 41. When the reel 22 is in its rearwardmost position 26, the path of travel of the tines 29 is parallel to the concave surface of the shield 50 to provide an efficient mechanism for transferring crop material to the crop conditioning means 30. The forward peripheral edge 52 is semicircular in shape and is positioned above the forward portion of the circular path of the rotating cutter blade 49. Each shield 50 is detachably affixed to a mounting bracket 57 by a suitable connecting means 54 for convenience in access to the corresponding cutter unit 42 immediately therebeneath.

The rearwardmost edge 53 of the shield 50 lies contiguous to a ramp 55 having a planar surface directed upwardly toward the conditioning means 30. A combination of shield 50 and ramp 55 forming a continuous guide surface 56 for cooperation with the reel 22 to convey severed crop material rearwardly toward the bite 34 of the crop conditioning means 30. As can be best seen in FIG. 2, guide surface 56 has a low profile configuration conducive to the efficient feeding of crop material, particularly "fines," to the crop conditioning means 30. An alternate configuration and position of the ramp 55 would be curved with a center of curvature at the same location as the shield 50 so as to provide a smooth continuously curved guide surface 56 directed toward the crop conditioning means 30.

As is best seen in FIG. 3, each shield is constructed such that the rearward portion 59, lying rearward of the connecting means 54, forms a uniform, transversely planar, uninterrupted surface extending from shield to shield across the entire transverse length of the cutterbar. This shield configuration enables an efficient feeding of the crop material to the conditioning means 30 without the need of a reel 22 having a scalloped tine configuration; therefore, the reel 22 can utilize tines 29 having a uniform length and still maintain efficient feeding characteristics.

In operation, the operator initially positions the reel 22 in accordance with the crop conditions to be encountered. For example, if proper feeding to the crop conditioning means 30 is of primary importance, the operator would position the reel 22 in its rearwardmost position 26 such that the path of the tines 29 is substantially parallel to the guide surface 56. On the other hand, if the crop is heavily lodged close to the ground, the operator would position the reel 22 in its forwardmost position 28 so that the tines 29 would reach down close to the ground, forward of the rotating cutter blade 49, to pick up the downed crop material before being severed by the cutterbar 40.

It should be noted that positioning the reel 22 in the forwardmost position 28 does somewhat lessen the efficiency of the reel in feeding crop material to the crop conditioning means 30 since the path of the tines 29 diverges away from the guide surface 56. Generally, the operator will select an intermediate position, corresponding, for example, to circular arc 27, to balance the desired crop pickup capabilities with the preferred feeding efficiency to the crop conditioning means 30.

After engaging crop material forward of the cutterbar 40 and pulling it rearwardly thereto to be severed by the rotating cutter blades 49, the reel 22 sweeps crop over the guide surface 56 toward the bite 34 of the crop conditioning means 30. The guide surface 56 prevents crop from becoming re-engaged with the rotating disc member 41 and its associated cutter blades 49 and, thereby, preventing the cutter units 42 from recutting already severed crop material. The crop conditioning means 30 then conditions the crop material in a known manner before depositing rearwardly thereof on the ground. The shape and configuration of the guide surface 56 is substantially uniform across the transverse length of the header so that a special configuration of the long and short tines on the reel 22 is not necessary for efficient feeding of the crop material to the crop conditioning means 30.

It will be understood that various changes in the details, material, steps and arrangement of parts which have been described and illustrated in order to explain the nature of the invention, will occur to and may be made by those skilled in the art upon a reading of the disclosure within the principles and scope of the invention.

Having thus described the invention, what is claimed is:

1. In a crop harvesting machine having a mobile frame adapted for movement over a field; a transverse cutterbar supported by said frame, said cutterbar having a plurality of rotatable cutter units; a rotatable crop conditioning means mounted on said frame rearwad of said cutterbar for conditioning severed crop material; a reel mounted on said frame above and forward of said cutterbar, said reel including an axis of rotation forward of said cutterbar, said reel having a plurality of tines rotatable about said axis of rotation, said reel being positionable such that said tines can engage crop material to pull it rearwardly toward said cutterbar and convey severed crop material towards said crop conditioning means; and drive means for rotating said reel, said conditioning means and each said cutter unit, the improvement wherein each said cutter unit comprises a bottom driven rotary disc cutter, said cutterbar including a generally concave shield, relative to said reel, forming a substantially continuous guide surface extending over each said disc cutter toward said crop conditioning means to cooperate with said reel in conveying severed crop material thereto, each said disc cutter including at least one cutter blade which, upon rotation of said disc cutter, extends forwardly beyond said arcuate shield.

2. The crop harvesting machine of claim 1 wherein said reel is selectively adjustably mounted on said frame for fore-and-aft movement relative to said cutterbar, said forward movement being downwardly inclined such that said reel can be selectably positioned for more efficient placement of said tines to pick up downed crop material.

3. The crop harvesting machine of claim 2 wherein said cutterbar includes stationary skid means for engaging the ground surface, said concave shield being concentric with said axis of rotation of said reel when said reel is in its rearwardmost position.

4. The crop harvesting machine of claim 3 wherein said reel and said cutterbar are mounted in a header forwardly suspended from said frame for movement independent of said frame, said conditioning rolls being mounted in said frame rearward of said header.

5. The crop harvesting machine of claim 4 wherein said concave shields are individually removable over the corresponding disc cutter unit for convenient access thereto.

6. The crop harvesting machine of claim 1 wherein said concave shields include a rearward portion having a transversely planar configuration, said rearward portion of each said shield being aligned with the rearward portion of each adjacent shield so as to form a continuous transversely planar portion of said guide surface, said tines on said reel having a uniform length.

7. The crop harvesting machine of claim 4 wherein said conditioning means includes two rotatable conditioning rolls, each said conditioning roll having an axis of rotation substantially parallel to said axis of rotation of said reel.

8. The crop harvesting machine of claim 7 wherein said conditioning rolls intermesh and define a bite therebetween, one of said conditioning rolls being biased or movement toward or away from the other said conditioning roll, said reel conveying severed crop material over said guide surface toward said bite.

9. The crop harvesting machine comprising:
  a mobile frame adapted for movement through a field of standing crop material;
  a crop harvesting header suspended forwardly from said frame for movement independent of said frame, said header including first and second opposing side sheets;
  header suspension means for yieldably suspending said header from said frame such that said header may follow the ground contours independently of said mobile frame;
  a cutterbar mounted on said header proximate to the ground for severing crop material, said cutterbar including a plurality of bottom driven rotatable cutter units, each said cutter unit having at least one cutter blade rotatable therewith for cutting crop material by impact action and a substantially vertically disposed spindle being the axis of rotation of said cutter unit;

a pair of intermeshing conditioning rolls transversely mounted in said frame above and rearward of said cutterbar for conditioning severed crop material;

a transversely disposed rotatable reel adjustably mounted between said first and second side sheets above and forward of said cutterbar, said reel including a transverse axis of rotation forward of each said spindle, said reel being adjustable in an inclined fore-and-aft direction, said inclination being downward during any associated forward adjustment such that said reel can be positioned to more efficiently pick up downed crop material forward of said cutterbar;

a transversely disposed ramp above and rearward of said spindles and forward of said conditioning rolls, said ramp being upwardly inclined toward said conditioning rolls;

an individual concave shield, relative to said reel, above each said cutter unit, said shields and said ramp forming a substantially continuous guide surface cooperable with said reel for the transfer of severed crop material toward said conditioning rolls, each said shield being concentric with said axis of rotation of said reel at the rearwardmost adjustable position, each said shield being individually detachable from said guide surface for access to the corresponding said cutter unit and fastening means for affixing said shield to said guide surface, each said shield having a semi-circular forward peripheral edge positioned relative to said corresponding cutter unit so that only the corresponding said at least one cutter blade projects forwardly thereof to sever standing crop material, said guide surface being operable to substantially prevent a recutting of severed crop material; and drive means for providing rotational power to said reel, said conditioning rolls and each said cutter unit.

10. A crop harvesting machine comprising:
a mobile frame;
a crop harvesting header suspended forwardly of said frame, said header being vertically movable independent of said frame;
a cutterbar mounted in said header for severing crop material from the ground, said cutterbar including a plurality of bottom driven rotatable disc cutter units, each said cutter unit including at least one cutter blade for severing said crop material by impact action;
a rotatable conditioning means mounted in said frame rearward of said header for conditioning severed crop material;
a reel mounted in said header above and forward of said cutterbar, said reel including an axis of rotation positioned forwardly of said cutterbar, said reel further including a plurality of tines for engaging crop material and conveying same rearwardly over said cutterbar toward said conditioning means;

a substantially continuous guide surface positioned above said cutterbar and extending upwardly and rearwardly toward said conditioning means, said guide surface including a concave shield, relative to said reel, over each said cutter unit, said guide surface being cooperable with said reel for the transfer of crop material rearwardly toward said conditioning means each said at least one cutter blade rotating with the respective said cutter unit beneath said concave shield and projecting at least partially forward of said concave shield to sever crop material; and drive means for rotatably powering said reel, said conditioning means and each said cutter unit.

11. The crop harvesting machine of claim 10 wherein said reel and said cutterbar are mounted in a header forwardly suspended from said frame for movement independent of said frame, said conditioning means being mounted in said frame rearward of said header.

12. The crop harvesting machine of claim 11 wherein said conditioning means includes two rotatable conditioning rolls, each said conditioning roll having an axis of rotation substantially parallel to said axis of rotation of said reel.

13. The crop harvesting machine of claim 12 wherein said conditioning rolls intermesh and define a bite therebetween, one of said conditioning rolls being biased or movement toward or away from the other said conditioning roll, said reel conveying severed crop material over said guide surface toward said bite.

14. The crop harvesting machine of claim 13 wherein said reel is selectively adjustably mounted on said frame for fore-and-aft movement relative to said cutterbar, said forward movement being downwardly inclined such that said reel can be selectably positioned for more efficient placement of said tines to pick up downed crop material.

15. The crop harvesting machine of claim 14 wherein said concave shields include a rearward portion having a transversely planar configuration, said rearward portion of each said shield being aligned with the rearward portion of each adjacent shield so as to form a continuous transversely planar portion of said guide surface, said tines on said reel having a uniform length.

16. The crop harvesting machine of claim 10 or 15 wherein said cutterbar includes stationary skid means for engaging the ground surface.

17. The crop harvesting machine of claim 16 wherein said concave shield is concentric with said axis of rotation of said reel when said reel is in its rearwardmost position.

18. The crop harvesting machine of claim 17 wherein said concave shields are individually removable over the corresponding disc cutter unit for convenient access thereto.

* * * * *